United States Patent [19]

Iwamura et al.

[11] 4,340,953
[45] Jul. 20, 1982

[54] INFORMATION RECORDING MEDIUM AND RECORDING AND REPRODUCING SYSTEM USING THE SAME

[75] Inventors: Soichi Iwamura, Fuchu; Yasuaki Nishida, Tokyo; Toshimi Yamato, Musashino; Norikazu Sawazaki; Yoshio Nishi, both of Yokohama; Masaharu Watanabe, Yokosuka; Norio Endo, Yokohama, all of Japan

[73] Assignees: Nippon Hoso Kyokai; Tokyo Shibaura Denki Kabushiki Kaisha, Kawasaki, both of Japan

[21] Appl. No.: 147,620

[22] Filed: May 7, 1980

[30] Foreign Application Priority Data

May 14, 1979 [JP] Japan .................................. 54-58090

[51] Int. Cl.³ .............................................. G11B 9/06
[52] U.S. Cl. .................... 369/126; 369/276; 365/174
[58] Field of Search ................ 369/126, 276; 365/174, 365/218, 149

[56] References Cited

U.S. PATENT DOCUMENTS

| 3,072,543 | 1/1963 | Lubow et al. | 369/126 |
| 3,185,968 | 5/1965 | Hammond | 369/126 |
| 3,826,877 | 7/1974 | Leedom et al. | 369/126 |
| 4,057,788 | 11/1977 | Sage | 365/174 |

Primary Examiner—Raymond F. Cardillo, Jr.
Attorney, Agent, or Firm—Oblon, Fisher, Spivak, McClelland & Maier

[57] ABSTRACT

An information recording medium comprises a silicon substrate, a silicon dioxide film formed on one principal surface of the semiconductor substrate and a silicon nitride film formed on the silicon dioxide film. A recording electrode stylus is moved relative to and along the surface of the silicon nitride film while applying a recording signal voltage between the stylus and substrate, thus causing charges corresponding to the recording signal voltage to be passed through the silicon dioxide film by the tunnel effect and stored in the silicon nitride film.

6 Claims, 8 Drawing Figures

INFORMATION RECORDING MEDIUM AND RECORDING AND REPRODUCING SYSTEM USING THE SAME

This invention relates to an information recording medium which uses a semiconductor in the form of, for example, a disc and a recording and reproducing system using the recording medium.

Information recording and reproducing systems using a disc-like information recording medium have been known using magnetic, optical and electrostatic capacitance video discs. Of these video discs, the magnetic video disc provides for a very low information recording density; for example, with a magnetic disc with a diameter of 40 cm the recording of the video signal on one side can be made only for 7.5 seconds.

On the other hand, the optical video disc is capable of recording at a very high density, since a disc made of a plastic material is used and a laser beam is used with it as a writing and reading stylus. For example, with a plastic disc of a diameter of 30 cm the recording of the video signal can be made for 30 to 60 minutes. With this optical system, however, a physical or chemical process is required for obtaining a disc capable of reading out the recorded signal after writing it, that is, the recorded signal cannot be read out immediately after its writing. Also, when information is once written, it cannot be simply changed. For rewriting information a chemical or physical process similar to that used for writing is required, and rewriting of all or part of information immediately after its writing cannot be made.

The electrostatic capacitance video disc also has similar merits and demerits to those of the optical video disc.

An object of the invention, accordingly, is to provide an information recording medium and recording and reproducing system using the same, which are capable of reading out information immediately after writing it, and also readily capable of rewriting part or all of the written information without the need for any physical or chemical process, as well as permitting the recording of information at a very high density.

The information recording medium according to the invention is made of a semiconductor having a structure, which is obtained by forming a first insulating film of a thin oxide film of about several tens angstroms on a semiconductor substrate such as mono-crystal silicon or a polycrystal silicon and then forming a second insulating film having a charge storage function, for instance a silicon nitride film, having a thickness of no greater than 1,000 angstroms on the oxide film. The stylus for writing, erasing and reading information is obtained by depositing a metal electrode on one side surface of a hard insulating body, for instance a sapphire stylus. This stylus is run in contact with the surface of the semiconductor disc along an information recording track formed on the disc surface. At this time, a signal voltage of several tens volts is applied between the electrode of the stylus and the semiconductor substrate, and electric charge is injected through the oxide film into traps formed within the nitride film according to the signal to effect the writing.

As a result of this writing, a depletion layer capacitance which changes according to the quantity of the injected electric charge is formed in the portion in contact with the nitride film. Thus, the written information is read out by detecting changes of the depletion layer capacitance with the movement of the stylus. For example, non-destructive read-out can be made by impressing a high frequency signal upon the stylus electrode and detecting changes of the aforementioned depletion layer capacitance with the movement of the stylus electrode. For erasing the written information, the electric charge that has been injected into the traps of the nitride film may be removed through discharge caused by applying a voltage of the opposite polarity to that at the time of the writing between the stylus electrode and semiconductor substrate.

This invention can be more fully understood from the following description when taken in connection with the accompanying drawings, in which.

Figure 1:
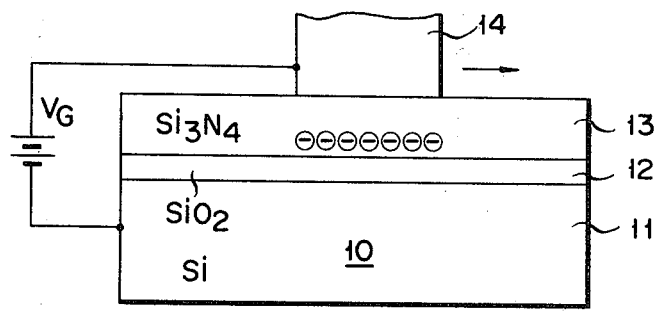
FIG. 1 is a schematic view showing the construction of an embodiment of the semiconductor disc memory device according to the invention.

The invention will now be described in detail with reference to the accompanying drawings. FIG. 1 is a view showing the basic construction of an embodiment of the semiconductor disc memory device according to the invention. Generally designated at 10 is a part of a disc memory which serves as an information recording medium according to the invention. The full-wafer NOS (nitride-oxide-semiconductor) structure is obtained, for instance, by forming a SiO$_2$ film 12 about 20 Å on an n-type or p-type silicon substrate 11 of a disc-like shape and then forming a Si$_3$N$_4$ layer 13 of about 500 Å on the SiO$_2$ film. A metal electrode 14 is used in contact with the surface of the recording medium 10 as a stylus for writing, erasing and reading information with respect to this medium. In each of the cases of writing, erasing and reading information, a corresponding signal voltage V$_G$ is applied between the metal electrode 14 and silicon substrate 11, and the metal electrode 14 is moved relative to the recording medium 10 over the same while the signal is being applied. In practical use, the silicon substrate 11 is directly put on a turn-table made of metal and the signal voltage V$_G$ may be applied between the metal electrode 14 and the turn-table (not shown).

Figure 2:
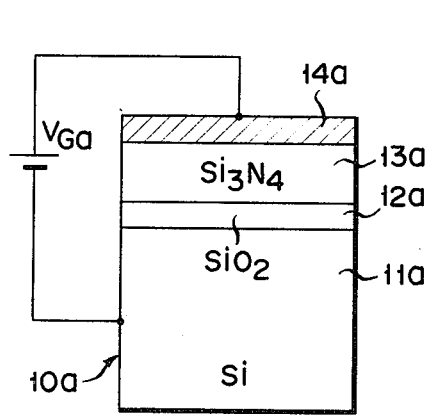
FIG. 2 is a view schematically showing the construction of a well-known MNOS non-volatile semiconductor memory.
Figure 3:
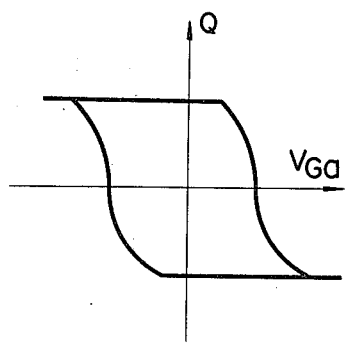
FIG. 3 is a graph showing a relation between applied voltage to the MNOS memory and storage charge density therein.

It is to be noted that when contacting the metal electrode 14, the recording medium 10 having the NOS structure is practically equivalent in structure to a known MNOS capacitor 10a as shown in FIG. 2. In FIG. 2, parts corresponding to those in FIG. 1 are designated by like reference numerals with a suffix "a". As is well known in the art, the MNOS capacitor 10a has a hysteresis characteristic as shown in FIG. 3, in which the ordinate is taken for the density Q of charge stored in the nitride film 13a and the abscissa for the electrode voltage $V_{Ga}$. In other words, it functions as a memory. According to the invention, the construction in which the metal electrode 14 is moved over the NOS recording medium 10 can be thought to be equivalent in effect to that of a number of MNOS capacitors 10a which are continuously formed.

The operation of the semiconductor disc memory of the above construction for recording and non-destructive reading of information will now be described.

Figure 4:
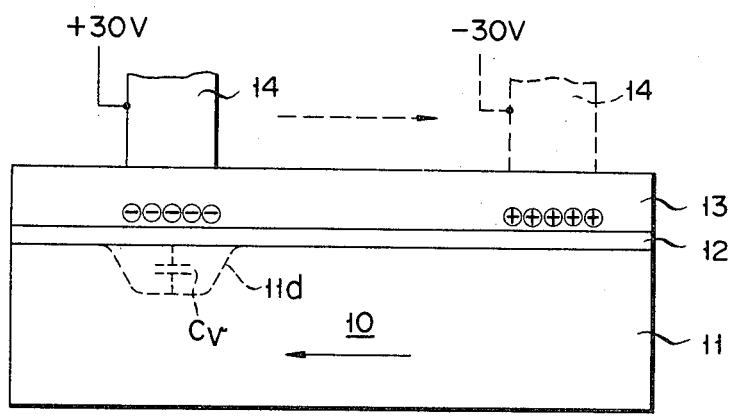
FIG. 4 is a view illustrating the operation of writing information in a semiconductor disc memory according to the invention.

In the first place, the recording is made by applying the voltage $V_G$ between the silicon substrate 11 and metal electrode 14. When the voltage $V_G$ is applied to the metal electrode 14, electrons (or holes) are permitted by the tunnel effect to pass through the $SiO_2$ film 12 to reach and be held in traps in the $Si_3N_4$ layer 13. Denoting the charge density (number of unit charges per $cm^2$) by Q/q, the hysteresis curve as shown in FIG. 3 is obtained in general. When the metal electrode 14 is moved in the direction of a dashed arrow as shown in FIG. 4 from a position shown by solid lines to a position shown by dashed lines while at the same time changing the voltage $V_G$ from +30 V to −30 V, the $Si_3O_4$ layer 13 is charged correspondingly, i.e., charged negatively first and positively later. Actually, the semiconductor disc memory 10 is rotated in the direction of solid arrow with respect to the metal electrode stylus 14, but for the sake of brevity of the description it is assumed that the stylus 14 is moved. The charge density reaches as high as $10^{11}$ to $10^{12}/cm^2$ at this time. Thus, by applying a voltage $V_G$ corresponding to a recording signal the recording can be made with the charge as information carrier. When recording a video signal, a frequency modulated (FM) video signal is usually recorded. In the case of such FM recording, the information is recorded in terms of areas of presence and absence of charge rather than the magnitude of charge. This also applies in the case of a digital signal recording.

Figure 5:
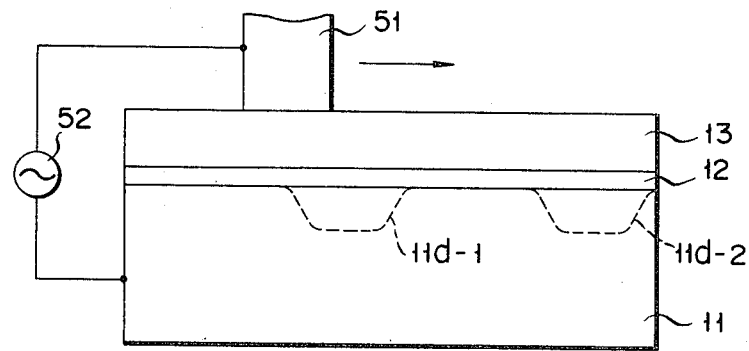
FIG. 5 is a view illustrating the operation of reading information from the semiconductor disc memory according to the invention.

The method of reading out the information which is recorded in the form of the corresponding charging will now be described. In FIG. 4, a depletion layer 11d is assumed to be formed in the n-type silicon substrate 11 with the negative charging of the $Si_3N_4$ film 13. In this case, the capacitance $C_0$ of the $Si_3N_4$ film 13 and the capacitance $C_v$ of the depletion layer 11d, per unit area, are respectively given as $$C_0 \approx \epsilon_N \epsilon_0 / dT$$

and $$C_v = \epsilon_{Si} \epsilon_0 / tm$$

where $d_T$ is the thickness of the $Si_3N_4$ film 13, tm is the thickness of the depletion layer lld in the silicon substrate 11, and $\epsilon_N$ and $\epsilon_{Si}$ are respectively the specific inductive capacities of $Si_3N_4$ and Si. In the above equations, the capacitance $C_0$ of the $Si_3N_4$ film 13 is constant, but the capacitance $C_v$ of the depletion layer 11d changes since the thickness tm of the depletion layer 11d changes according to the charge storage state of the $Si_3N_4$ film 13, i.e., the recording state. Thus, the detection of the charged state, i.e., reading of the recorded information can be made by detecting the changes of the capacitance $C_v$ of the depletion layer 11d. FIG. 5 shows a specific example of the method of detecting the capacitance changes. Here, a metal electrode 51 as the reading stylus in contact with the surface of the nitride film 13 of the recording medium 10 is supplied with an AC signal of, for instance, 1 MHz—0.5 volt (rms) and relatively moved over the medium 10 along a track formed thereon, and the capacitances of depletion layers 11d-1, 11d-2, . . . formed in the recording medium 10 are measured. As the method for tracking the information recording track, such a tracking mechanism as described in pages 43–47 of NIKKEI ELECTRONICS dated Oct. 30, 1978, may be used.

At the time of reading the recorded signal, it is necessary to detect the changes of the capacitance $C_v$ of the depletion layer, and there is no need of determining the value of the capacitance itself. Thus, it is possible to use for the reading a system, which reads out the changes of the capacitance as corresponding frequency changes with a detecting circuit incorporating an oscillator circuit, as disclosed in the RCA Review (Vol. 39, March 1978, page 39). This literature teaches the use of an AC signal at 915 MHz, 10 $V_{pp}$ as a reading signal. Since the signal amplitude is small, the destruction of the memory charge will not result.

The CN ratio (carrier-to-noise ratio) of the reading signal is determined by the fluctuation of the quantity of the memory charge, i.e., the number N of electrons, present in the contact electrode aperture size, i.e., the area of the tip of the stylus 14 in contact with the film 13. Since the charging electron density $Q_T$ in the $Si_3N_4$ film 13 reaches $10^{12}/cm^2$, with an aperture size of $(1.5 \times 0.2)$, $3 \times 10^3$ electrons are present within the aperture area. In this case, the fluctuation δ is $\delta = 1/\sqrt{N} = 0.018$, so that a CN ratio of 35 dB can be obtained. That is, practically the same CN ratio as that of the presently available magnetic recording and reproducing system can be obtained. In a system in which a television signal formed by an NTSC system is directly recorded by the FM recording, a carrier signal band of at least 15 MHz is required, and it is necessary to write information within 20 nsec. at the most. To this end, about 50 V is required as the writing voltage in a typical case, in which the thickness of the $SiO_2$ film 12 is 20 Å and the thickness of the $Si_3N_4$ film 13 is 550 Å, and in this case a charged electron density of about $10^{11}/cm^2$ is obtained in the nitride film 13. However, the current that flows through the $Si_3N_4$ film 13 at this time exponentially changes with the applied voltage and is high compared to that flowing through an oxide film of the same thickness, so that it is desirable to reduce the writing voltage so as to obtain a stabilized memory characteristic. In this case, substantially the same order of the memory charge electron density can be obtained by reducing the thickness of the $SiO_2$ film 12. Further, for realizing high-speed writing with a lower voltage, charge traps may be intentionally provided by providing a high-melting metal such as tungsten along the boundary between the $SiO_2$ film 12 and $Si_3N_4$ film 13.

While the basic construction and the principles of recording and reproduction according to the invention have been described above, the individual component elements will now be described in detail.

The method of forming the recording medium will now be described. The very thin oxide film 12 that is formed on the semiconductor substrate 11 of, for instance, n-type, is obtained by leaving the substrate in an oxygen ($O_2$) atmosphere diluted with an inert gas such as argon (Ar) at about 800° C. for about 30 minutes. It can also be obtained through water vapor oxidation at about 600° C. In addition to these high temperature oxidation methods, it is further possible to employ a low temperature oxidation method using boiling hot concentrated nitric acid. After the formation of the oxide film 12, the silicon nitride film 13 may be formed thereon by several methods. An example of the method is a vapor growth method. In this case, as the reaction gas such combinations as ($SiH_4$, $NH_3$) ($SiH_2$, $Cl_2$, $NH_3$) and ($SiHCl_3$, $NH_3$) may be used. Recently, there has also been used a method, in which plasma is produced in a mixture gas consisting of $SiH_4$ and $NH_3$ for obtaining the silicon nitride film 13. By either of these methods the object of silicon nitride film 13 can be obtained. In the case of forcibly introducing charge traps into the recording medium 10 from the outside as a modification, a high-melting metal such as tungsten or molybdenum is provided to form a film as thick as the size of the single atom or of a corresponding thickness between the $SiO_2$ film 12 and $Si_3N_4$ film 13 in addition to the aforementioned manufacturing process. In this case, a low speed vacuum deposition method or a molecular beam epitaxy method may be used. Also, it is possible to use a method based upon chemical reactions. Further, depending upon the content of information memorized, the construction according to the invention is made more effective by effecting a heat treatment under suitable conditions as a last step of the manufacturing process.

Figure 6:
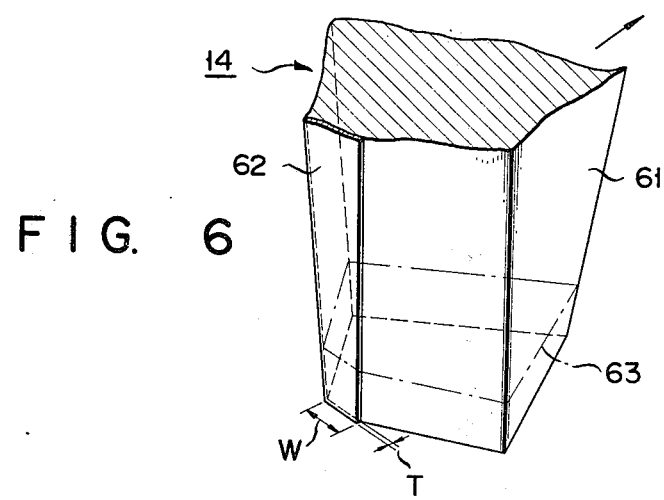
FIG. 6 is a perspective view showing an example of the construction of a tip portion of the stylus which is used for writing, erasing and reading information with the device according to the invention.

Now, the stylus 14 for writing, erasing and reading information will be described. As shown in FIG. 6, it has a construction obtained by depositing a metal electrode 62 of tantalum or titanium on one side of a hard insulator 61 such as sapphire or diamond. The Figure shows only a tip portion of the stylus 14. In this case, the contact area of the portion of the metal electrode 62 in contact with the recording medium has the most important influence upon the recording performance. More particularly, the width W of the metal electrode 62 (usually 1 to $2\mu$) determines the width of the recording track, and the thickness T of the deposited metal 62 (usually 0.1 to $0.2\mu$) is one of the factors determining the shortest recording wavelength. The insulator 61 of sapphire or diamond is a support for the electrode 62. To provide for sufficient contact between the surface of the recording medium 10 of the NOS structure and the tip surface of the electrode a pressure, i.e., stylus pressure, is applied, and it is desired that this pressure is uniformly applied to the entire tip surface of the sapphire. For example, with a sapphire tip surface area $70\mu^2$ and a stylus pressure of about 40 mg practically sufficient contact between the electrode 62 and the surface of the NOS recording medium 10 can be obtained; in this case the pressure is 60 kg/cm². (In the case of the LP record disc, the stylus tip pressure is 1,000 kg/cm²) Where the electrode 62 has a rectangular shape as is shown in the Figure, the recording track width and recording wavelength are unchanged even when the support 61 of sapphire or the like is worn out so that its tip surface reaches a level shown by a one-dot line 63 in FIG. 6. This means that if it is assumed that the stylus is worn out up to the level of the one-dot line 63 after being run to cover, for instance, 40,000 km under the aforementioned stylus pressure, a deterioration in the recording or reproducing function will not result for a running period of about 1,000 hours at an average speed of 10 m/sec. By applying silicone oil as lubricant to the surface of the recording medium 10, it is possible to ensure sufficient contact between the metal electrode 62 and $Si_3N_4$ film 13 and also prevent intrusion of air which is low in the specific inductive capacity.

As has been described above, according to the invention the recording is made not magnetically but electronically, and this permits writing, erasing and non-destructive reading, and also as in the case of magnetic recording no chemical or physical process is required between the writing and immediately reading processes, but the non-destructive reading can be obtained immediately after the writing. The most important advantage of the device according to the invention is that it is capable of high-density recording. In other words, sufficient recording and playback can be obtained even if the electrode contact area size (W × T in the example of the stylus shown in FIG. 6) is $1.5\mu$ by $0.2\mu$, i.e., with a recording track pitch of $1.5\mu$ and a shortest recording wavelength of $0.4\mu$. The other factors determining the shortest recording wavelength, i.e., recording density, include the thickness of the $Si_3N_4$ film 13 and the depletion layer 11d. (See FIG. 4) These values can be set to be less than $0.1\mu$ in the design. Thus, compared to the presently available magnetic disc the recording density can be increased by the order of three figures (i.e., several thousand times), about one figure in the recording wavelength and about two figures in the track pitch. This means that with the same disc diameter the recording of video signal on one side can be made for a couple of hours. While considerably high precision for undesired vibrations of disc surface is required for the disc rotating mechanism with the reduction of the track width, it is only slightly higher than in the case of the master recording mechanism of the conventional optical video disc and can be technically readily realized.

Figure 7:
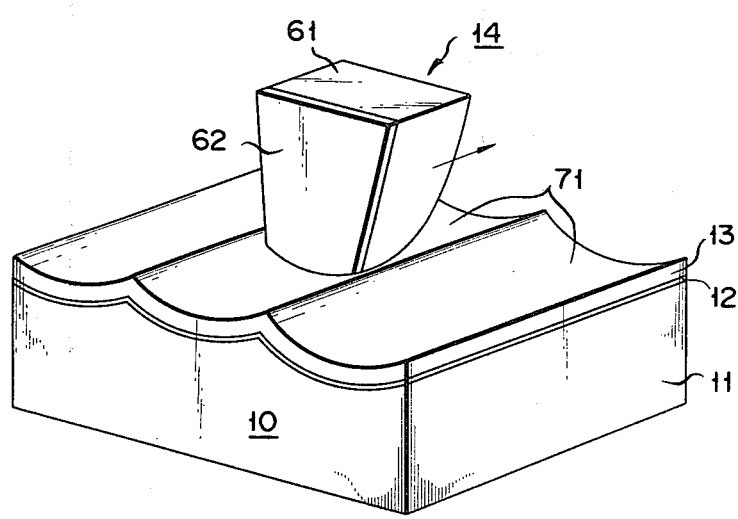
FIG. 7 is a perspective view showing a state in which a stylus is engaged in a tracking groove formed on the surface of a semiconductor disc memory according to the invention.

Further, since according to the invention the reading of information is achieved by detecting the changes of the electrostatic capacitance, an electrostatic capacitance type video disc player can be used for the reading of information. Particularly, with an arrangement as shown in FIG. 7, in which a track groove 71 is provided on the recording medium 10 and traced by the stylus 14 for writing, erasing and reading information in the direction of arrow, no tracking servomechanism is needed, and also an existing groove track type electrostatic capacitance video disc player may be directly used for the playback.

Figure 8:
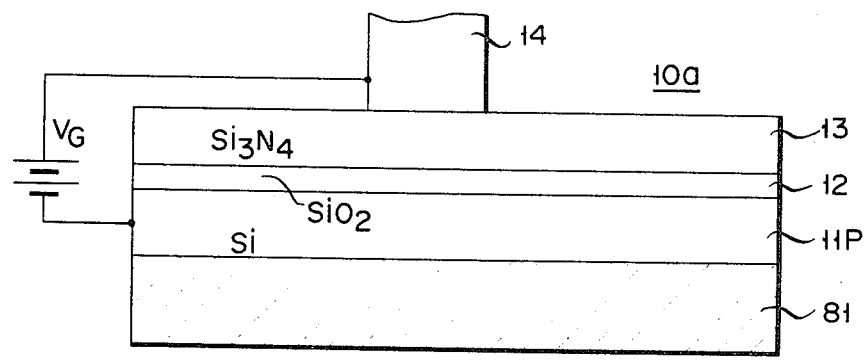
FIG. 8 is a schematic sectional view showing a construction of another embodiment of the invention.

As the semiconductor substrate for the recording medium according to the invention, a silicon monocrystal wafer is convenient from the standpoint of handling. When making a disc from this wafer, however, restrictions are imposed upon the upper limit of the diameter. However, 30 cm diameter discs have been developed in the laboratory stage, and if a mono-crystal ingot having a length of 30 cm and a diameter of 30 cm is produced, nearly 100 silicon discs having a thickness of 5 mm and a diameter of 30 cm can be obtained from it. Also, similar effects to those of the mono-crystal disc are obtainable with a disc 10a having a structure as shown in FIG. 8, which is obtained by depositing polycrystal silicon 11p in the form of a disc on the surface of a glass disc 81 through the CVD (chemical vapor deposition) treatment and then laminating the $SiO_2$ film 12 and $Si_3N_4$ film 13. Further, there is an established method of polishing the disc surface, and a surface roughness of about 10 Å will be obtained by using a chemical polishing method. The formation of the $SiO_2$ film and the CVD process for forming the $Si_3N_4$ can be very readily achieved with established techniques. Particularly, the $Si_3N_4$ is very hard and also serves as a protective layer. Furthermore, unlike the magnetic disc the manufacture involves no process of laminating a hard (basic) layer, a magnetic plating layer and a protective layer on an aluminum disc, so that the cost of manufacture can be low compared to the case of the magnetic disc. Moreover, the defect density of the mono-crystal silicon is presently about one defect per $cm^2$, which is lower by two figures than the announced video disc master density of one defect per 1 $mm^2$. Thus, these defects can be sufficiently cancelled with an ordinary drop-out canceller.

Regarding the stylus for writing, erasing and reading, the same stylus can be principally used for the writing, erasing and reading like a magnetic head for the magnetic recording, that is, only a single stylus is necessary. Also, since it is constructed by depositing the rectangular electrode 62 on one side of the hard insulator 61 such as sapphire or diamond as the support, as shown in FIG. 6, its construction is simple compared to the magnetic head. Further, it is made such that even if the tip surface of sapphire is worn out together with the electrode, the width and thickness thereof are unchanged, so that this has no adverse effect upon the recording and playback.

As the non-volatile memory, MNOS RAMs have been developed, but the deterioration of their characteristics that are caused when the writing and erasing are repeated a number of times is one of the presently posed problems. As an example, the literature shows that the deterioration commences after $10^4$ times of the repetition. Even if this is true, where the recording medium is used as video disc, for instance with the writing and erasing repeated 10 times for every day, its characteristics will not be deteriorated at least for three years. Particularly, where the disc is used for compiling television broadcast programs, frequent writing and erasing are exceptional normally. Meanwhile, it is known that the non-destructive reading can be repeated up to $10^9$ times. This means that the deterioration of the image quality will not occur even after the same picture frame are reproduced $10^9$ times (i.e., $10^9$ frames are reproduced) by still reproduction, that is, even after the playback is continued for one year.

Since the memory device according to the invention is thus capable of high density recording and also capable of reproduction immediately after recording without need of any chemical or physical treatment at all, it finds extensive applications. Particularly, it is useful for the television program compilation and sufficiently meets the program production field. In the television program production and compilation, it is required that various special effect reproductions can be simply obtained by different ways of arrangement of basic words, each of which is constituted by a serial signal for one video signal frame (covering 33 msec. from a vertical sync signal of the NTSC signal to the next one). Hitherto, the compilation has been made with the VTR. The specific compilation systems include a slice system, in which the recorded tape is physically cut and necessary portions are connected to one another, and dubbing system, in which two VTRs are concurrently run and the recorded material is transferred from one VTR to the other one cut after another to produce a compiled tape. In the former case, the work of physically cutting and connecting together cut tape portions is involved. In the latter case, although no work of physically cutting the tape is involved, the period of the transfer and also a great deal of time for detecting the starting point of a recorded program and auxiliary running of the original tape and master tape and fast feed up to the next cut are involved until the compilation of the compiled master tape (the additional time required being 10 times the actual dubbing period). In either case, a great deal of labor and time are consumed. Particularly, up to date the outdoor VTR recording is widely increased owing to the miniaturization of the color television camera and VTR, but in this case the compilation work is very cumbersome, and automation of the compilation work is strongly called for. The disc device according to the invention is very useful in the light of such demand. If the device is adapted such that one picture frame is recorded during one rotation of the disc, since the signals of adjacent frames are spaced apart by the recording track pitch (usually 1 to $2\mu$), the reproducing stylus can be moved by several tens $\mu$ within the access time (i.e., vertical blanking period) of 1 msec, so that it is readily possible to make access to required information within several tens frames. Also, in an arrangement, in which two reproducing styluses are symmetrically disposed on the opposite sides of the center of rotation of the disc and adapted to alternately read out one cut so that one of the styluses can make access to the next cut within a couple of second while the other stylus is reproducing, and also in which all the cuts are longer than the maximum access time, these cuts may be compiled in a desired order to produce a serial signal even if they are recorded at random on the disc. In other words, without physically cutting the tape or dubbing, similar effects can be obtained in the compilation with the disc. Besides, in comparison to the prior art video disc with the disc device according to the invention it is possible to simply record a video signal, reproduce it without need of any chemical or physical treatment after the recording and also desirably rewrite or erase it, the labor and time in the compilation work can be largely reduced, and also the freedom of the compilation can be widely increased.

The disc memory device according to the invention is useful not only for recording and reproducing video signals but also for use as a computer memory. As the presently available large-diameter silicon full-wafer memory, there is a one-chip 1-megabit RAM which has a very high recording density compared to other semiconductor memories. In this case, 1 megabits are accommodated in a chip of 6 $mm^2$, so that 1 bit occupies an area of $6\mu^2$. Besides, this conventional memory requires wiring on the semiconductor, and its yield is low. In contrast, the semiconductor disc memory device according to the invention requires no electrode wiring on semiconductor. Also, with a 30 cm diameter disc with the innermost diameter set to 15 cm, the smallest bit length at that diameter to $0.2\mu$ and the track pitch to $1.5\mu$, as high recording capacity as $10^{11}$ bits can be obtained. Further, with a diameter of 40 cm and by further reducing the recording pitch and the recording length of one bit, it is possible to obtain a recording capacity of one trillion bits. Furthermore, if the crystal defect density is $1/cm^2$, a 30 cm diameter disc has only 530 defects, and it is possible to memorize addresses of these defects in a memory device so that the defective portions will not be used. Thus, according to the invention a very compact construction can be obtained as a large-capacity memory device for a computer as well.

Though disc-like shaped memory devices are described in the aforesaid embodiments, it is also possible to embody the invention as a tape- or sheet-like shaped semiconductor memory device

What we claim is:

1. An information recording medium comprising a semiconductor substrate, a first insulating film formed on one principal surface of said semiconductor substrate, and a second insulating film formed on said first insulating film and having a charge storage function, said second insulating film having a principal surface which forms the top surface of said recording medium, wherein charges corresponding to a recording signal are passes through said first insulating film by a tunnel effect and stored in said second insulating film when a voltage corresponding to said recording signal is applied between said substrate and a recording electrode stylus which moves along said top surface.

2. An information recording and reproducing system comprising:
   a recording medium including a semiconductor substrate, a first insulating film formed on one principal surface of said semiconductor substrate, a second insulating film formed on said first insulating film and having a charge storage function, said second insulating film having a principal surface which forms the top surface of said recording medium;
   an electrode stylus for contacting said second insulating film and moving relative to said second insulating film;
   means for applying a predetermined signal voltage between said electrode stylus and said semiconductor substrate, said signal voltage being a positive DC voltage during recording, a high frequency voltage during reading and a negative DC voltage during erasing;
   wherein at the time of recording, charges corresponding to the recording signal voltage are stored in a boundary portion of said second insulating film immediately above said first insulating film in response the application of a positive DC signal voltage; and
   wherein at the time of reading changes of the magnitude of a depletion layer formed within said semiconductor substrate are read out according to the charge storage state of said second insulating film as the corresponding capacitance changes in response to a high frequency signal voltage.

3. A system according to claim 2, wherein said semiconductor substrate is a mono-crystal silicon wafer and said first and second insulating films respectively consist of silicon dioxide ($SiO_2$) and silicon nitride ($Si_3N_4$).

4. A system according to claim 2, wherein said semiconductor substrate is a polycrystal silicon layer deposited on a glass substrate and said first and second insulating films are respectively silicon dioxide and silicon nitride.

5. A system according to claim 2, wherein the surface of said semiconductor substrate is formed with a spiral groove and said first and second insulating films successively formed on said semiconductor substrate surface have similar surface shapes to said substrate surface having said spiral groove.

6. A system according to claim 2, wherein said electrode stylus comprises a stylus body consisting of a hard insulating body and a rectangular metal electrode formed on one side surface of said stylus body.

* * * * *